United States Patent [19]

Whitaker

[11] Patent Number: 4,723,826
[45] Date of Patent: Feb. 9, 1988

[54] LENS TYPE SOLAR COLLECTOR REQUIRING NO ORIENTATION SYSTEM

[76] Inventor: Ranald O. Whitaker, 4719 Squire Dr., Indianapolis, Ind. 46241

[21] Appl. No.: 645,256

[22] Filed: Aug. 29, 1984

[51] Int. Cl.$^4$ ................................................ G02B 6/00
[52] U.S. Cl. ................................ 350/96.10; 126/424; 350/96.24
[58] Field of Search ............... 350/96.10, 96.18, 96.24; 126/424, 425, 440, 417

[56] References Cited

U.S. PATENT DOCUMENTS

| | | | |
|---|---|---|---|
| 4,187,834 | 2/1980 | Hoinski | 126/425 |
| 4,215,410 | 7/1980 | Weslow et al. | 126/424 X |
| 4,461,278 | 7/1984 | Mori | 126/440 |
| 4,483,311 | 11/1984 | Whitaker | 126/440 |

Primary Examiner—William L. Sikes
Assistant Examiner—Akm E. Ullah

[57] ABSTRACT

A conventional fiber optic solar collector employs a matrix of lenses mounted in an enclosure similar to that of a conventional flat plate collector. Each lens focuses a solar image upon the open end of a respective optical fiber. The fibers are bundled together and led to a using device. In this conventional system the entire enclosure is rotated to face the sun. The present invention permits this enclosure to be mounted in fixed position facing the southern sky. As the sun traverses the sky, a pattern of solar images sweeps across the focal plane of the lenses. A plate is placed in this focal plane and the optical fibers mounted in it so that their open ends form a similar pattern. The plate is then moved to cause the solar images to fall on their respective optical fibers.

In a significant improvement, a second plate is mounted behind the first. Fibers pass through holes in this second plate. The second plate is moved in conjunction with the first so that the open ends of the fibers are maintained perpendicular to the paraxial rays of the incident radiation.

7 Claims, 10 Drawing Figures

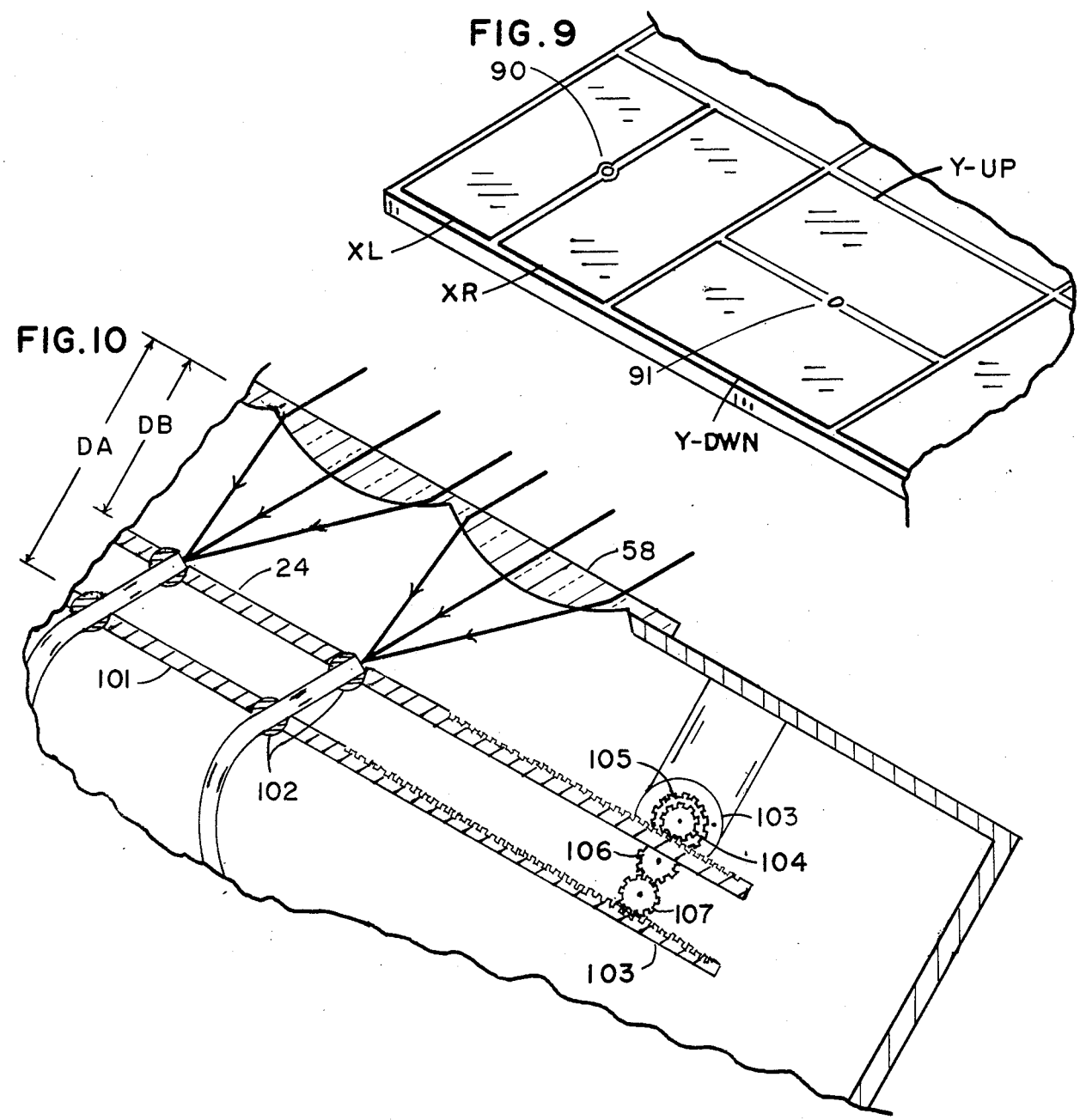

LENS TYPE SOLAR COLLECTOR REQUIRING NO ORIENTATION SYSTEM

CROSS REFERENCES TO RELATED APPLICATIONS

There are no related applications. Consequently, there are no cross references.

STATEMENT AS TO RIGHTS TO INVENTIONS MADE UNDER FEDERALLY SPONSORED RESEARCH AND DEVELOPMENT (IF ANY)

This invention was not made under Federally sponsored research and development. Consequently there is no statement regarding such rights.

BACKGROUND OF THE INVENTION

1. Field of the Invention.

This invention is in the field of solar collectors.

2. Description of the Prior Art.

Whitaker (App. No. 06/521,491 Filed 10/09/79) discusses a solar collector using a matrix of lenses and a set of optical fibers, each lens focusing solar radiation upon a respective optical fiber. The entire array of lenses is oriented to face the sum. Consequently each solar image is kept on the optical axis of its respective lens at all times.

Diner (U.S. Pat. No. 4,201,197) discusses a similar system, using one large lens focusing upon the open end of a bundle of optical fibers.

Bowers (U.S. Pat. No. 4,282,858 filed 3/27/80) discusses a simlar system to that of Whitaker.

The French and Japanese are both working significantly in this field. No publications are presently on hand.

Pertinent details regarding flat plate collectors and the Whitaker system will next be discussed.

A typical installation of conventional flat plate solar collectors is shown in FIG. 1. The collectors 11, 12, and 13 are placed on a south-facing roof. Solar radiation passes through the glass plate with which each collector is covered. Within the collector this radiation is absorbed on a blacken surface and turned into sensible heat. A portion of this heat passes to a working fluid circulated through the collector and is by that fluid carried to a using device (such as a hot water heater) inside the house. A second portion is lost by conduction back up through the glass to the ambient air. As the ambient temperature drops, this loss becomes excessive. A typical collector will lose half the collected energy via this conduction when the outside temperature drops to 273 K (freezing). Consequently conventional flat plate collectors are useful for heating water and homes only in temperate or tropic climates.

A second significant feature of the flat plate collector is that the maximum temperature it can achieve in the working fluid is about 350 K. This is achieved with a gray body absorber and a solar constant of 800 w/m$^2$. A spectrally selective surface permits a higher temperature to be attained. But such surfaces are expensive. As a consequence they are not much used. At 350 K the surface reradiates as much power in infrared radiation as it absorbs in solar radiation. If there is to be significant power delivered to a using device then the absorber must operate at a temperature below 350 K.

Whitaker Fiber Optic Collector. FIG. 2 shows a conventional fiber optic collector such as that disclosed by Whitaker, application Ser. No. 06/521,491. A mosaic of lenses 21 faces the sun. Solar radiation 22 passes through lenses 21 and forms solar images on the open ends of optical fibers 23. Optical fibers 23 are bundled together and led to a using system such as a hot water heater.

A significant feature of this system is that there is no conduction loss to the surrounding air. The heat which this system delivers is a function of the solar radiation impinging on the collector and that only. Consequently it can deliver as much heat on the coldest day of winter as it does on the hottest day of summer. This is in stark contrast to the conventional flat plate collector—which can deliver no heat on the coldest day of winter when that heat is needed most.

A second significant feature is that heat can be delivered at high temperature. It can be shown that the theoretical limit is the temperature of the surface of the sun—some 6,000 K. This can be achieved by operating the system outside the atmosphere, using lossless materials, and using an absorber such as that described in Whitaker U.S. Pat. No. 3,234,931.

A third significant feature is that an orientation system is required. It must turn the entire array to face the sun. Orientation systems are available but they are trouble prone and costly. This is especially true in location where storms are common.

SUMMARY OF THE INVENTION

A frame similar to that of a conventional flat plate collector is placed in fixed position facing generally toward the sun. The front of the collector consists of a matrix of lenses each about 10 cm square—or hexagonal. This invention provides a set of optical fibers the open end of each of which fibers is kept in position to receive a respective one of these solar images. This result is obtained by placing a "positioning" plate in the focal plane of the lenses. The open ends of the optical fibers terminate in this plate, forming a pattern identical to that of the solar images. A servo system moves the plate to keep the open ends of the optical fibers each under its respective solar image. In an alternate system a computer is used to position the plate.

The axis of the open end of each optical fiber should face the incident radiation. To accomplish this desired result, the basic system is modified to provide an "orientation" plate on the fiber side of the positioning plate. The orientation plate bears a pattern of holes similar to those of the positioning plate. Pivots through which the optical fibers pass are placed in both plates. The motors which move the positioning plate also move the orientation plate—but at a faster rate. This keeps the fibers facing the impinging radiation.

THE DRAWING

FIG. 9 is a sketch showing how a preferred system of position sensors are placed on the positioning plate.

FIG. 10 is a sectional view of a collector built in accordance with the present invention and including means for orienting the fibers so that they face the incoming radiation.

THE PREFERRED EMBODIMENT

Solar Image Paths In Focal Plane

Figure 1:
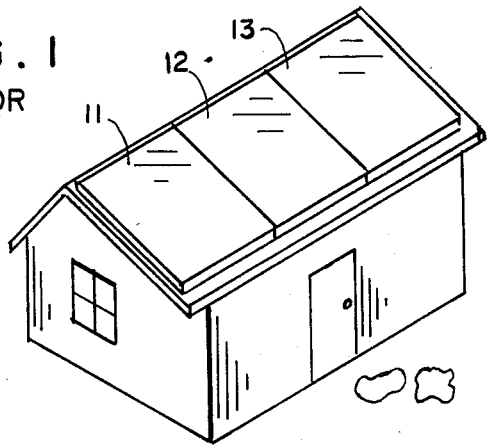
FIG. 1 is a sketch of a home having prior art flat plate collectors on the roof. The collectors could also be fiber optic collectors of the type covered by the present invention.
Figure 2:
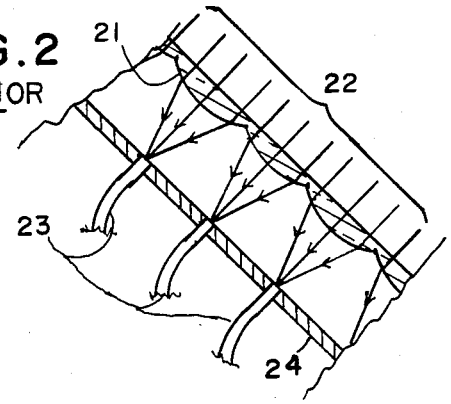
FIG. 2 is a crossectional view of a fiber optic collector of conventional variety.

Suppose we take the fiber collector of FIG. 2 and mount it on the roof so that at noon on Mar. 21 and again at noon on Sept. 21, the solar images fall on their respective optical fibers. This causes the plane of the collector to be parallel to the earth's axis. In general this is the optimum orientation for the system.

Figure 3:
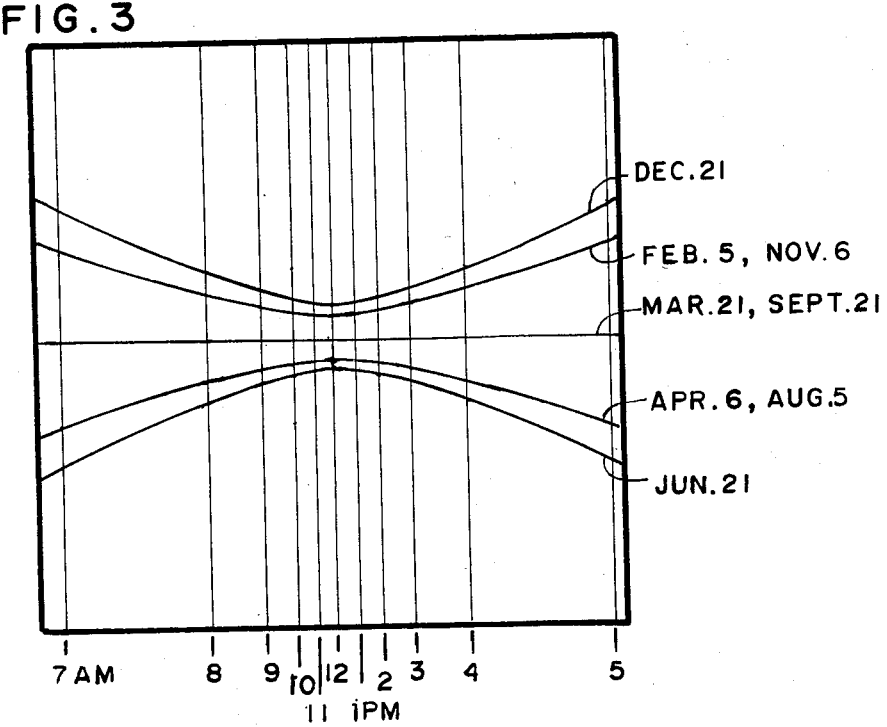
FIG. 3 is a diagram showing paths taken by solar images in the focal plane of a collector of the type covered by the present invention.

As the sun traverses the sky, the pattern of solar images sweeps in reverse direction across plate 24. Typical paths followed by the pattern are shown in FIG. 3. On Mar. 21 and Sept. 21, the sun is in the plane of the equator. Consequently the path is a straight line. For any given time of day and for any given day of the year we are interested in determining just where in the focal plane the pattern of solar images will be.

Figure 4:
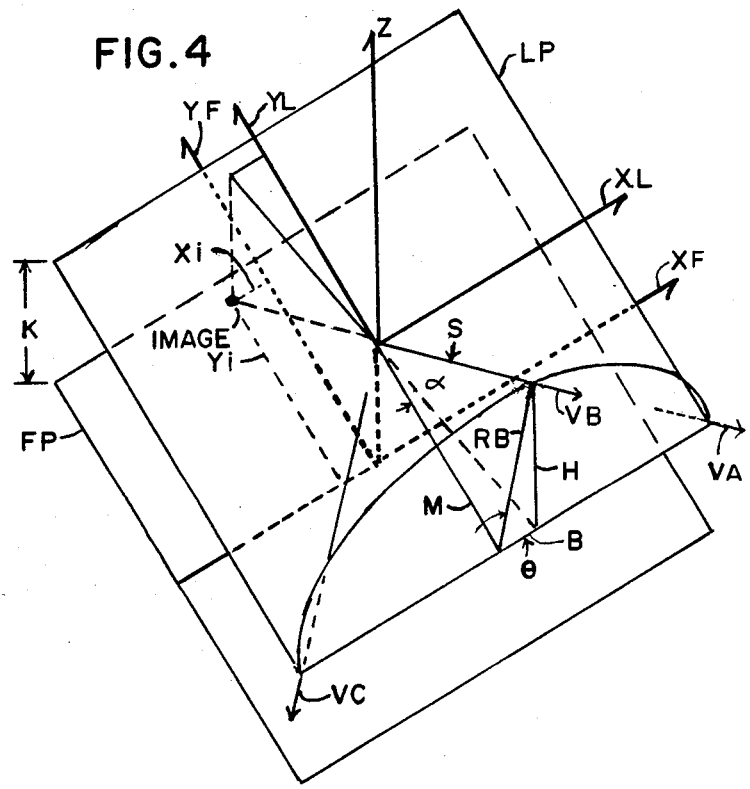
FIG. 4 is an analytical diagram used in obtaining the paths of FIG. 3.

Consider FIG. 4. Plane FP is the focal plane. Plane LP is the lens plane. The mounting of the system is such that the Y axis is always parallel to the earth's axis. The X axis is always parallel to the surface of the earth where the collector is located.

Vectors VA, VB, and VC indicate the direction of the sun at collector sunup, collector noon, and collector sundown respectively. The upper half-cone defined by these three vectors defines the path taken by the sun through the collector sky. It is to be noted that during the summer months, collector sunup and sundown ar not the same as our conventional sunup and sundown. Sunup for the collector is 6:00 A.M. every day. Sundown is 6:00 P.M. Each collector day is exactly 12 hours. During the winter the surface of the earth intervenes, causing collector sunup and sundown to be the same as conventional sunup and sundown.

FIG. 4 is illustrative of the situation which could exist at 10:00 A.M on the morning of Dec. 21. We are interested in determining coordinates Xi and Yi of the solar image in the focal plane. For this time of day, the sun will appear on vector VB. Angle $\theta$ is the "time angle". It is determined by time of day. The following equations apply.

$$RB = S \sin \alpha \quad\quad 1.$$

where S is the slant height of the cone.

$$B = RB \cos\theta = (S \sin\alpha) \cos\theta \quad\quad 2.$$

$$H = RB \sin\theta = (S \sin\alpha) \sin\theta \quad\quad 3.$$

$$M = S \cos\alpha \quad\quad 4.$$

$$Xi = K\,B/H = (S \sin\alpha \cos\theta)/S \sin\alpha \sin\theta) = K/\tan\theta \quad\quad 5.$$

$$Yi = K\,H/M = (K\,S \cos\alpha)/(S \sin\alpha \sin\theta) = K/(\tan\alpha \sin\theta) \quad\quad 6.$$

Angle $\alpha$ is the season angle. The last two equations give the desired Xi and Yi. The inputs to these equations are $\alpha$, $\theta$, and K. A hand calculator was used to solve with time of day should be taken into consideration in precise calculations. A computer may be programmed to calculate $\alpha$ as a function of time of year and then calculate XI and YI as functions of $\alpha$, $\theta$, and K.

The Structure

Figure 6:
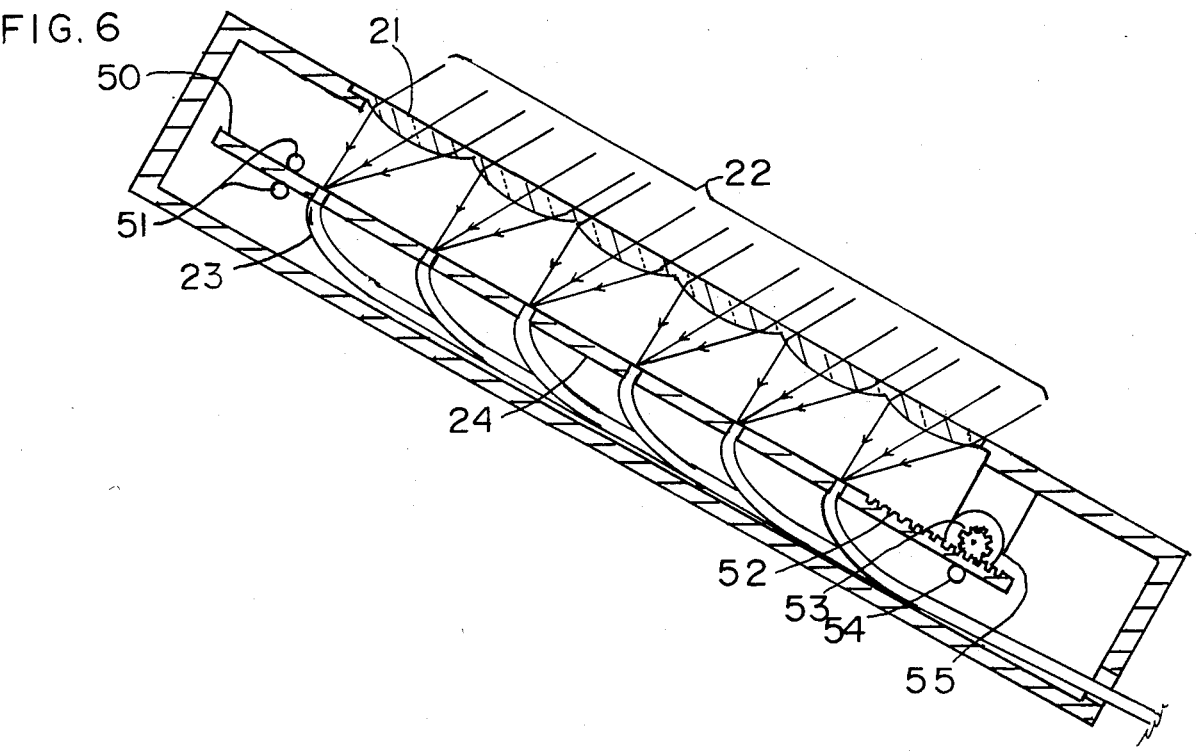
FIG. 6 is a sectional view of a collector built in accordance with the present invention and indicating how the positioning plate is moved to keep the solar images on the open ends of the optical fibers.

Examine FIG. 6 for a moment. Suppose it is noon of a typical day in December. The incoming solar radiation is slanted as indicated. The slanting causes the refracted rays to form solar images to the left of the optical axes of the respective lenses—as indicated. Optical fibers 23 have open ends fixed in positioning plate 24. Motor 55 through its appended pinion gear 53 moves rack 52 to the left. This action continues until rack 52 appended to positioning plate 24 causes the open ends of optical fibers 23 to fall under their respective solar images. Guides 51 and 54 hold plate 24 in the focal plane. This is the Y axis control. A similar control operates for the X axis.

When the system is not properly aligned, the signals developed by the two sensors of a pair of sensors will not be the same in magnitude. There will be an "error". If the image falls more on the first sensor of a pair of sensors than on the second sensor of that pair, the first sensor will develop a greater signal than the second sensor develops. If the image falls more on the second sensor than on the first sensor, the second sensor will develop a greater signal than the first sensor develops. In this manner the signals developed by a pair of sensors indicate the "nature of error" of the error. At any particular instant the system is either properly aligned, displaced in one direction, or displaced in the other direction. In case of displacement, the direction and magnitude of that displacement constitutes "nature of error".

Figure 5:
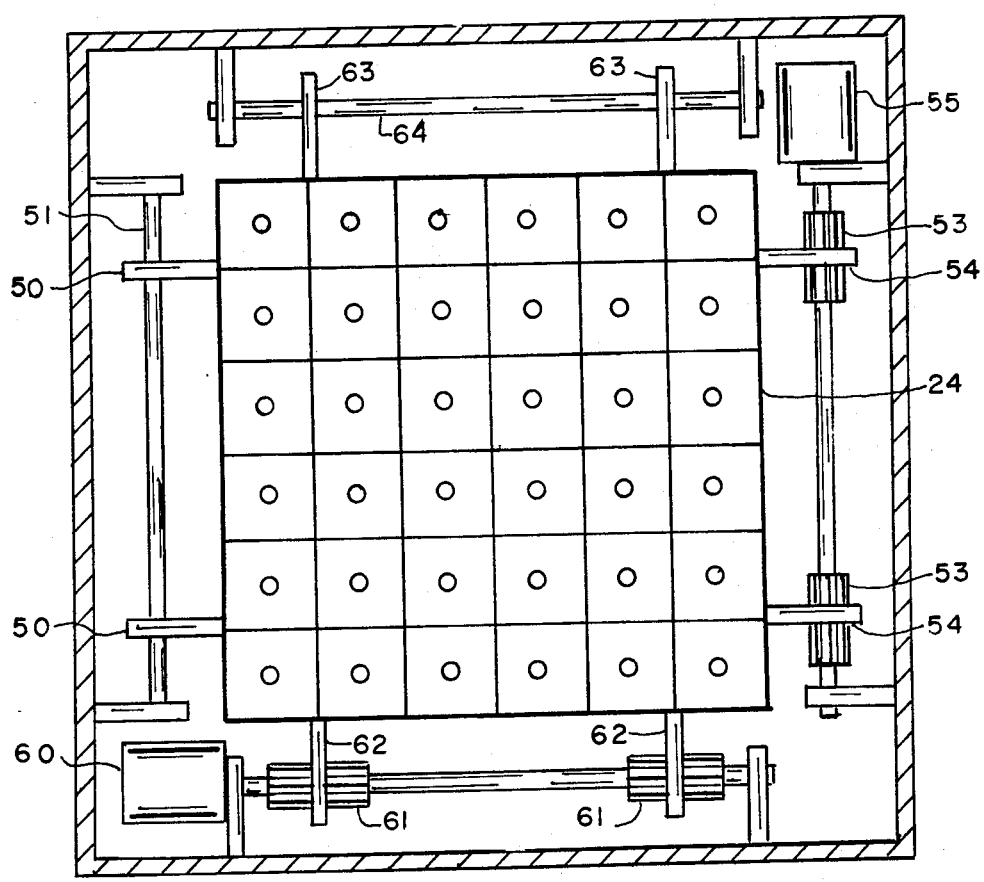
FIG. 5 is a sectional view of a collector built according to the present invention and showing the mechanism for moving the positioning plate.

Consider the plan view of the drive system shown in FIG. 5. Motor 55 turns pinion gears 53, which move racks 52 with attached positioning plate 24, back and forth in the X direction. Guides 50 slide over rod 51. Similarly, motor 60 turns pinion gears 61, which move racks 62, which move plate 24 up and down in the Y direction. Guides 63 slide along rod 64. A rod similar to rod 64 fits over the top of guides 63 and a rod similar to rod 51 is positioned above guides 50. These prevent movement of plate 24 in a direction normal to the page.

Computerized System

Figure 7:
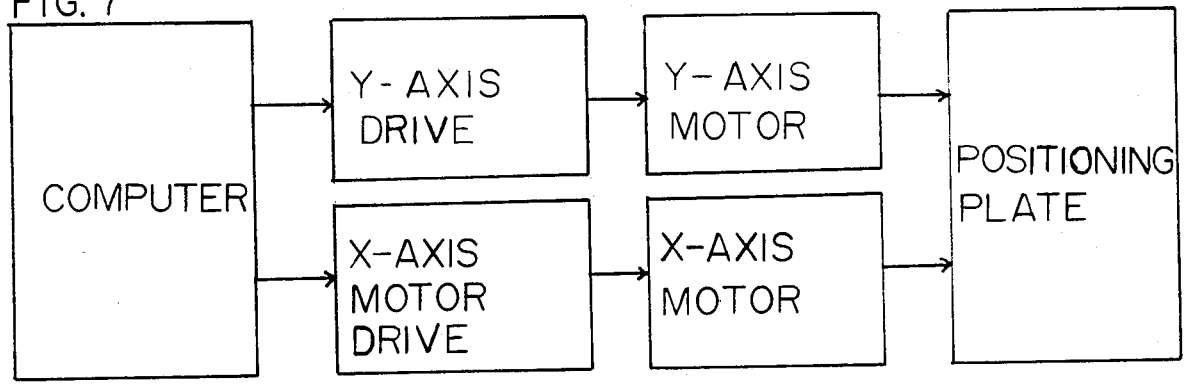
FIG. 7 is a block diagram of a computerized control system for use with the present invention.

The positioning system can use a computer which calculates the correct position for the positioning plate as a function of day of year, time of day, and focal length of the lenses. A block diagram for such a system is shown in FIG. 7. Significant features of this system are 1. There is no possibility of instability. There are no oscillations.

2. The positioning plate is maintained in correct position throughout the day. Drifting clouds to not cause misorientation.

3. At time of installation the collector must be precisely oriented—the orientation must match the program inside the computer. The mounting must be sufficiently rigid that this precise orientation may be maintained throughout the life of the collector. Any error in orientation which develops will cause the solar images to move from the optical fibers. The computer will maintain this error, rather than correct it.

Servo Drive System

Figure 8:
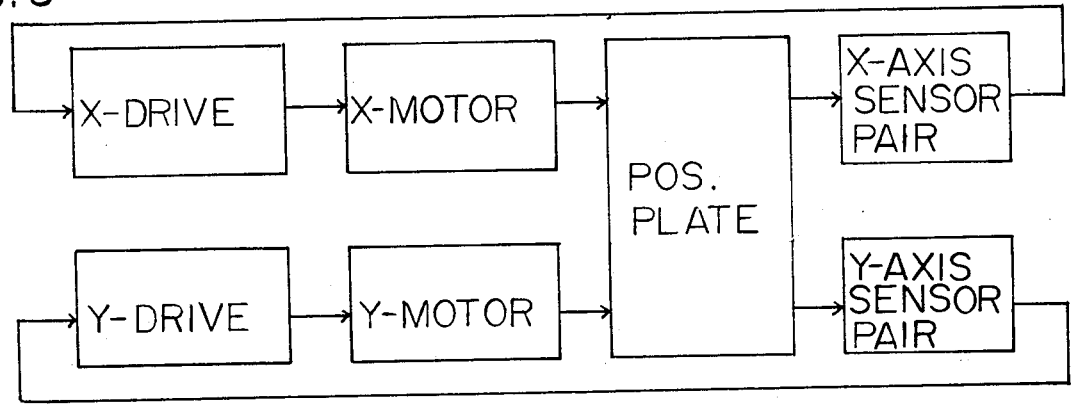
FIG. 8 is a block diagram of a servo control system for use with the present invention.

An alternate servo drive system is diagrammed in FIG. 8. The Y sensor senses when an error along the Y axis exists and feeds a signal to the Y axis drive which causes this error to be reduced to zero. The action is similar for the X axis. A preferred sensor system is illustrated in FIG. 9. Four sensors are mounted on one corner of the positioning plate. Sensors XR and XL are placed around optical fiber 90 as shown. When the solar image is correctly positioned on the open end of optical fiber 90, the two sensors will receive equal amounts of the stray radiation appearing at the edge of the solar image. If the solar image is displaced to the right, sensor XR will receive more than sensor XL.

If the solar image is displaced to the left—XL will receive more than XR. Sensors XR and XL are preferably silicon solar cells. Each develops an electrical output proportional to the light falling upon it. The difference in these two outputs is used to casue the X axis driver to act to move the positioning place so that the error is brought to zero. The Y axis control operates in similar manner, using sensors YUP and YDWN positioned around fiber 91. Significant features of this system are:

1. Instabilities may develop. This problem arises with every closed loop system.

2. Passing clouds disturb the system. Cause the system to jig and job. Bending the optical fibers and wearing out the mechnical parts. These jigs and jogs may be reduced by slowing the response of the control loops.

3. Independent control must be provided to cause the system to face the sun at sunup.

4. The chief advantage of this system over the computer system is that small errors caused by frame warpage or freezing of the ground on which the system is mounted—are corrected by the servo system.

ALIGNING THE FIBERS TO THE INCOMING RADIATION

The maximum possible amount of radiation enters the fiber when the solar radiation is normal to the fiber. During early morning and late evening the radiation comes in at a considerable slant. It is the nature of the open end of the optical fiber that as the slat at which radiation strikes the fiber increases, more of it is reflected and less accepted. Also, there is a critical angle beyond which no radiation will be transmitted down the fiber. Consequently the system of FIG. 2 can operate effectively from about 9:00 in the morning until 3:00 in the afternoon. This period may be extended if means is provided for turning the optical fibers so that they always face the incoming radiation.

Means for accomplishing this for the X axis is illustrated in FIG. 10. An orientation plate 101 is placed under positioning plate 24. Pivots 102 for holding the fibers are placed in both plates. The X motor 103 turns pinion 104, moving positioning plate 24. Motor 103 also turns pinion gear 105—which turns gear 106, which turns gear 107, which moves orientation plate 101. The ratio of pitch diameter of gear 104 to pitch diameter of gear 105 is equal to the ratio of da to db. As far as the X axis is concerned, this causes the ends of optical fibers to face the centers of their respective lenses.

A similar system causes the fibers to face the centers of the lenses as far as the Y axis is concerned—causes the paraxial ray to be perpendicular to the open end of the optical fiber. The paraxial ray is defined as the ray coming from the center of the solar disc.

COMPARISON OF PRESENT SYSTEM WITH A CONVENTIONAL FIBER OPTIC SYSTEM

In the conventional system (See Whitaker, application Ser. No. 06/521,491) the plate holding the optical fibers does not move relative to the lens matrix. It keeps each optical fiber on the optical axis of its respective lens. The entire collector is turned to face the sun. The following are significant:

1. The system can be used from conventional sunup to sundown during the summer. About fifteen hours. The present system can be used only during the twelve hours centered about noon. Toward the limits of this period the solar spot becomes excessively large and traverse required of the positioning system becomes excessive. This limits the effective period to no more than 10 hours. During winter the effective period is less than this.

2. The conventional system causes the collector to face the sun at all times. The amount of solar radiation impinging on the collector is not reduced according to the cosine law. For the current system the solar radiation impinging upon the collector is reduced by the cosine law. This further reduces the effective hours of the current collector. During summer it will be effective from 8:00 A.M until 4:00 P.M. During winter, from 9:00 A.M. until 3:00 P.M.

3. The one great advantage of the current system over the conventional system is that it is mounted fixed to the supporting structure. This large collector containing the matrix of lenses is not swinging around in the open inviting the next strong wind to provide it free transportation into the next county.

GENERAL COMMENTS

1. The lens structure depicted in FIG. 2 and subsequent figures facilitates cleaning of the outer surface. Since the lens surface is inside and the outer surface is flat, the latter may be covered with a plastic sheet of essentially the same index of refraction as the lens material. The contacting surface may be wiped with a fluid to cause close adherence. When the sheet becomes dirty, it may be whisked off and a new one put on.

2. The plates may be replaced by a wire framework.

3. Several alternate pivotal mechanisms may be used in place of those depicted in FIG. 10.

4. The pinion and rack drive system may be replaced by one of several alternate systems. Such as a hydraulic drive involving a piston.

5. The sensor system of FIG. 9 is suggestive only. Several alternate systems may be used.

6. In the preferred system the collector is positioned so that the plane of the lenses is normal to solar radiation at noon on the 21st of March and again on the 21st of September. However, the conditions of particular installations and the requirements of those installations may make it desirable to depart from this orientation. For instance, should there be general cloud cover during the summer months, then the collector should be tilted so that it faces the winter sun—to increase effectiveness of collection during the winter. Likewise, if the system is used strictly for space heating in winter, the collector should be tilted to face the winter sun. But if the cloud cover is in winter and the system is used to generate power for operating an air conditioner, then the collector should be tilted more toward the summer sun. If there is cloud cover in the mornings but not in the afternoons—the collector should be turned toward the west.

6. Convex lenses have been shown in the several figures. Fresnel lenses may be used. Fresnel lenses would reduce the amount of lens material required. However, there is a loss associated with the serrations. In most applicatios the additional mass of the lens material used in the convex lenses is not sufficient to justify the loss associated with the Fresnel lenses.

7. The radiation delivered by the system is capable of generating high temperatures. The radiation may be delivered to a stove for cooking means. It may be used to provide heat to a steam engine. It may be used to light interior rooms and light factories. In the last application the broad spectrum of solar radiation provides better "seeability" than do sharp line spectra such as that provided by fluroescent tubs.

8. Care must be exercised in selection of optical fibers. Excessive attenuation within the fibers causes unwanted losses and heats the bundled fibers to excessive temperatures. DuPont provides a plastic fiber (Crofon) which is 1 mm in diameter and has losses permitting it to be used for distances of a few meters. The material is inexpensive. Glass fibers from one of several sources have very low attenuation—permitting them to be used for distances up to 1 km. However, diameters are low and cost is high. At present there is no market for large diameter low-loss fibers. As this market develops, appropriate materials will become available.

9. The preferred material for the lenses is molded plastic. However, glass lenses may be used. Transparency to solar radiation is the only requirement. Quality of lenses must be higher than that for lenses used in conventional systems (such as that of Whitaker discussed previously) since the former must focus sharply over an appreciable portion of the focal plane while the latter must focus sharply only on the optical axis.

I claim:

1. A stationary solar collector system for collecting solar radiation from the sun;
    said system comprising means, including a matrix of lenses, for focusing solar radiation onto a focal plane to form a set of solar images in said plane;
    a set of optical fibers, each of said fibers having an open end;
    a positioning plate holding said open ends of said fibers within a common plane which is coincident with said focal plane; and
    positioning means for moving said plate laterally relative to said matrix of lenses, said optical fibers being substantially equal in number to the number of lenses in said matrix and positioned within said plate with said open ends being in the same pattern or configuration as the lenses in said matrix and such that each open end is at the focal point of a corresponding lens in said matrix, said positioning means moving said plate laterally relative to said matrix of lenses in such manner that said pattern of open ends of said fibers can always be made to coincide with said pattern of solar images as the sun traverses the solar collector.

2. A system for collecting solar power as in claim 1;
    said positioning means being a biaxial drive comprising an X drive for positioning said plate in the X direction and a Y drive for positioning said plate in the Y direction; said X direction lying the plane of said plate and said Y direction being perpendicular to said X direction and also lying in the plane of said plate;
    said X drive including a pair of X photoelectric sensors, an X amplifier, and an X motor;
    said X pair of photoelectric sensors being mounted on said plate and adapted for developing an X set of electrical signals indicating magnitude and direction of error in positioning of said plate in the X direction;
    said X amplifier being adapted in response to said X electrical signals for delivering an X drive signal;
    said X motor being adapted in response to said X drive signal for moving said positioning plate in that X direction which will reduce the X positioning error to zero; and
    said Y drive being similarly composed to said X drive and performing a service in said Y direction similar to that performed by said X drive in said X direction.

3. A system for collecting solar power as in claim 1;
    said positioning means being a bi-axial drive comprising a computer; an X drive for positioning said plate in the X direction and a Y drive for positioning said plate in the Y direction, said X direction lying in the plane of said plate and said Y direction being perpendicular to said X direction and also lying in the plane of said plate;
    said X drive, in response to electrical signals received from said computer, being adapted for moving said plate in the X direction;
    said Y drive being adapted in response to electrical signals received from said computer for moving said plate in the Y direction; and
    said computer being modified by a computer program, said modification adapting said computer for generation of said electrical signals.

4. A system for collecting solar power as in claim 2;
    said solar power having associated with its solar radiation having a paraxial solar ray;
    said system including means for orienting each of said optical fibers so that the open end of each of said optical fibers is approximately perpendicular to said paraxial solar ray delivered to said open end by said respective lens;
    said orienting means including an orientation plate placed on the fiber side of said positioning plate and bearing a pattern of holes whose configuration is congruent to said solar image configuration;
    said X motor having gearing operatively associated with said X motor and said orientation plate for driving said orientation plate in the X direction and said Y motor having gearing operatively associated with said Y motor and said orientation plate for driving said orientation plate in the Y direction; and
    the gearing ratios of said gearing being selected to cause said orientation plate to move to keep the axes of the open ends of the said optical in alignment with respective paraxial rays.

5. A system as in claim 4;
    each of said holes in said orientation plate and each of said holes in said positioning plate bearing a respective pivot member rotatably mounted in said hole; and
    each of said pivot members bearing a hole through which a respective fiber passes.

6. A system for collecting solar power as in claim 3;

said solar power having associated with it solar radiation having a paraxial solar ray;

said system including means for orienting each of said optical fibers so that the open end of each of said optical fibers is approximately perpendicular to said paraxial solar ray delivered to said open end by said respective lens;

said orienting means including an orientation plate placed on the fiber side of said positioning plate and bearing a pattern of holes whose configuration is congruent to said solar image configuration;

said X motor having gearing operatively associated with said X motor and said orientation plate for driving said orientation plate in the X direction and said Y motor having gearing operatively associated with said Y motor and said orientation plate for driving said orientation plate in the Y direction; and the gearing ratios of said gearing being selected to cause said orientation plate to move to keep the axes of the open ends of said optical in alignment with respective paraxial rays.

7. A system for collecting solar power as in claim 6;

each of said holes in said orientation plate and each of said holes in said positioning plate bearing a respective pivot member rotatably mounted in said hole; and each of said pivot members bearing a hole through which a respective fiber passes.

* * * * *

UNITED STATES PATENT AND TRADEMARK OFFICE
CERTIFICATE OF CORRECTION

PATENT NO. : 4,723,826

DATED : February 9, 1988

INVENTOR(S) : Ranald O. Whitaker

It is certified that error appears in the above-identified patent and that said Letters Patent is hereby corrected as shown below:

Col. 1, Line 25.  Change "sum" to "sun".
Col. 1, Line 28.  Change "Diner" to "Dismer".
Col. 1, Line 43.  Change "blacken" to "blackenned-
Col. 1, Line 66.  Change "Whitaker Fiber Optic Collector" to all caps.
Col. 2, Line 26.  Change "location" to "locations".
Col. 5, Line 47.  Change "slat" to "slant".
Col. 7, Line 14.  Change "means" to "meals".
Col. 7, Line 19.  Change "tube" to "tubes".

Signed and Sealed this

Third Day of January, 1989

Attest:

DONALD J. QUIGG

Attesting Officer

Commissioner of Patents and Trademarks